United States Patent [19]

Eusemann et al.

[11] Patent Number: 4,884,002

[45] Date of Patent: Nov. 28, 1989

[54] ROTARY OR LINEAR ELECTRIC MOTOR WHOSE ARMATURE IS DRIVEN BY MEANS OF ULTRASONIC VIBRATIONS

[75] Inventors: Roland K. Eusemann, Aachen; Heinrich A. Oepen, Stolberg-Gressenich; Anton Hammers, Aachen, all of Fed. Rep. of Germany

[73] Assignee: U.S. Philips Corporation, New York, N.Y.

[21] Appl. No.: 260,204

[22] Filed: Oct. 19, 1988

[30] Foreign Application Priority Data

Oct. 21, 1987 [DE]  Fed. Rep. of Germany ....... 3735623

[51] Int. Cl.$^4$ ........................................... H01L 41/08
[52] U.S. Cl. .................................................... 310/323
[58] Field of Search ................. 310/323, 325, 328, 321

[56] References Cited

U.S. PATENT DOCUMENTS

| | | | |
|---|---|---|---|
| 4,325,264 | 4/1982 | Sashida | 310/323 X |
| 4,400,641 | 8/1983 | Vishneusky et al. | 310/323 |
| 4,453,103 | 6/1984 | Vishneusky | 310/323 |
| 4,548,090 | 10/1985 | Sashida | 310/323 X |
| 4,692,650 | 9/1987 | Okumura et al. | 310/323 |

FOREIGN PATENT DOCUMENTS

| | | | |
|---|---|---|---|
| 0623241 | 9/1978 | U.S.S.R. | 310/325 |
| 0658684 | 4/1979 | U.S.S.R. | 310/328 |
| 0794685 | 1/1981 | U.S.S.R. | 310/323 |

Primary Examiner—Mark O. Budd

[57] ABSTRACT

Armature (4) is driven by piezo-electric vibration elements (1) which are made to resonate by means of high-frequency electrical oscillations in order to produce ultrasonic vibrations which are transmitted to a plurality of drive pins (2) arranged as brushes a friction surface (6) of the armature (4) is pressed against free ends (5) a of the pins, the individual drive pins bein disposed at an angle $\alpha$ relative to the perpendicular to the contact portion of the friction surface (6). The angle of inclination $\alpha$ is then substantially equal to the static-friction angle or is slightly larger than this static-friction angle between the drive pins and the friction surface. Suitably, the angle of inclination is selected to be between 10° and 30°.

15 Claims, 9 Drawing Sheets

ROTARY OR LINEAR ELECTRIC MOTOR WHOSE ARMATURE IS DRIVEN BY MEANS OF ULTRASONIC VIBRATIONS

BACKGROUND OF THE INVENTION

The invention relates to a rotary or linear electric motor whose armature is driven by piezo-electric vibration elements which are made to resonate by means of high-frequency electrical oscillations this produces ultrasonic vibrations which are transmitted to a plurality of drive pins arranged as brushes and against whose free ends a friction surface of the armature is pressed, the individual drive pins being disposed at an angle α relative to the normal to the contact portion of the friction surface.

Such a piezo-electric motor is disclosed in U.S. Pat. No. 4,453,103. By applying a high-frequency alternating voltage to the piezo-electric vibration element mechanical vibrations are set up in this element, which vibrations are transmitted to the armature via the transmission pins. The amplitude of the mechanical vibrations is a few μm. The transmission pins, which may be arranged on the vibration element in the same way as brushes, transmit the mechanical vibration of the vibration element to the armature, each vibration causing the armature to be advanced by a corresponding number of μm. Each individual transmission pin can exert only a small translatory or rotatory force on the friction surface of the armature. The friction area between the rotor and the transmission pins is only a few square millimetres. Such a small friction area results in the transmission pins being subjected to substantial mechanical loads, which may lead to rapid wear.

In the construction described in U.S. Pat. No. 4,453,103 the transmission pins are set at an angle α relative to a perpendicular to the friction surface of the armature. The setting angle must have values between 40° and 50°. However, such a setting angle results in a low efficiency of the motor.

It is further known from U.S. Pat. No. 4,325,264 to make the angle at which the transmission pins are set very steep, for example 5°. This motor also has a low efficiency. Moreover, it can produce only comparatively small torques and tends to produce a substantial amount of noise under mechanical load.

SUMMARY OF THE INVENTION

The setting angle α is selected to be equal to or slightly larger than the static-friction angle, which is defined as follows $$\alpha \text{ static friction} = \arctan \mu$$

Here μ is the coefficient of friction between the drive pins and the friction surface of the armature. The coefficients of friction of typical friction pairs lie between substantially 0.2 and 0.7. Consequently, the optimum setting angle of the transmission pins is between 10° and 35°.

Such a motor exhibits a high efficiency, a low wear and a uniform and silent operation. A motor of this construction makes the use of piezo-electric motors interesting and opens up new fields of application. The advantage of a piezo-electric motor, such as its favourable spontaneous starting behaviour and the maximum torque transmission in the locked condition enable a stepped operation, which only depends on the electrical parameters, to be obtained. Thus, the steps of a stepper motor can be selected freely, independently of mechanical pole arrangements in the pathlength. This enables adjustment devices and gripper-arm movements to be realized with a substantially higher sensitivity than attainable until now.

In a further embodiment of the invention the setting angle is selected to be between 15° and 25°. Such an angle is found to yield a satisfactory ratio between input power and output power for many friction pairs.

In a further embodiment of the invention the direction of vibration is perpendicular or parallel to the friction surface in a manner known per se. The direction of vibration may be perpendicular to the friction surface in a manner known per se. However, it is found that for a correct operation of the motor it is equally possible to have a direction of vibration parallel to the friction surface. The orientation of the friction surface can then be adapted to the desired mechanical specifications of the construction.

The vibration elements may be arranged as a plurality of pins which extend parallel to each other at an angle of inclination α. Against the free ends of the pins a mass, for example in the form of a flat plate, is pressed.

The pins may be constructed as filamentary or as planar elements. At their free ends they may be provided with heads in order to enlarge the contact area with the armature.

The drive pins need not be secured to a flat vibration element but they may be secured, for example, to the circumferential surface of a ring. The axis of each individual pin in combination with the ring axis then defines a plane and is inclined at an angle α to the ring perpendicular through the foot point of the pin. A mass whose friction surface takes the shape of a ring or a ring segment is urged against the free ends of the pins. The annular vibration element is excited to produce radial resonant vibrations by applying a harmonic alternating voltage. This cause the mass to move in the direction of the ring axis.

In a further embodiment of the invention the cooperating friction pairs comprise pins of spring steel and an armature made of steel or a ceramic material ($Al_2O_3$). In a further embodiment of the invention it is advantageous if the cooperating friction pairs comprise an armature of a material soften than steel and pins which at least at their free ends comprise a head whose contact area with the armature is enlarged in proportion with the reduced hardness. Enlarging the contact area reduces the surface load on the armature and on the drive pins.

However, it is also possible to use other friction pairs. In a further embodiment of the invention the pins are made of steel or a rough synthetic resin and the armature is made of a tough synthetic resin, such as glass-fibre or carbon-fibre-reinforced resins. On the other hand, spring-steel pins and ceramic armatures exhibit a low wear, enabling the motor to be operated for a longer time before the armature has to be replaced.

In a further embodiment of the invention the setting angle α of the drive pins in a rotary motor comprising a circular flat armature disc decreases from the armature axis towards the periphery of the armature disc. In this way all the transmission pins, both those arranged at the inner side and those at the outer side, assist in providing an optimum drive.

In a special embodiment of the motor, which can be used a rotary motor, a piezo-electric annular vibration element, which is supported elastically in a radial direction and which is supported to be torsionally stiff in a circumferential direction, carries projecting drive pins on its outer wall, which pins cooperate with an inner wall of an armature. Such a coaxial piezo-electric rotary motor enables a compact and axially short construction to be obtained.

In a further embodiment of the invention the effect of wear on the motor performance can be eliminated substantially in that the inner wall of the cup-shaped armature is conical and the drive pins have different lengths adapted to said conical shape, so that the pins are always pressed against the inner wall with a substantially constant force, even in the event of wear of the pins or the inner wall. The conical shape of the friction surface guarantees that axially adjacent pins are loaded to substantially the same extent by a pressure element which urges the cup-shaped armature against the pins.

In a further embodiment of the invention the armature is divided into two sections, which are separately spring-loaded against the drive pins. By dividing the rotor into two sections which are separately spring-loaded towards the drive pins, the pressure exerted on the drive pins by the armature can be controlled more effectively.

In a further embodiment of the invention, in the form of a linear motor, the vibration element is constructed as a piezo-electric hollow cylinder through which a shaft is passed, either the shaft being movable as an armature relative to a stationary hollow cylinder or the hollow cylinder being movable as a runner relative to the shaft, the shaft being of oval cross-section. In a modification of this embodiment of the invention the drive plus on the upper half and on the lower half of the inner wall of the piezo-electric hollow cylinder are arranged in such a way that the pins, when they are pressed against the friction surface, produce a relative movement with respect to the shaft in one direction and the other pins, when they are pressed against the friction surface, produce a relative movement in the opposite direction. With such a linear motor it is simple to achieve reversible operation, for example for printers.

The arrangement described in U.S. Pat. No. 4,325,264 provides a movement in one direction only. In order to enable the direction of movement to be reversed, in order to achieve a reversible drive over a predetermined travel, the drive mechanism, in a further embodiment of the invention, comprises for example two vibration elements which can be energised separately. In a further embodiment of the invention an armature of U-shaped construction is provided and on the surface of the vibration elements drive pins are arranged in such a way that when the pins of one vibration element are pressed against the friction surface of the armature is moved in one direction and when the pins of the other vibration element are pressed against the friction surface the armature is moved in the opposite direction.

The pins of the first or the second vibration element can be pressed against the armature by means of, for example, an eccentric, a rocker, a lever or a worm gear, which means are actuated mechanically, electrically, piezo-electrically or magnetically.

The movements in opposite directions can also be produced by means of a single vibration element. For this purpose the surface of the vibration element can be divided into two halves. The drive pins are secured to the two halves in such a way that when the armature is pressed against the pins of one half a movement in one direction is obtained and when they are pressed against the other half a return movement is obtained.

BRIEF DESCRIPTION OF THE PREFERRED EMBODIMENT

FIG. 1 is a diagrammatic side section view illustrating the principle of a piezo-electric motor comprising a stator provided with drive pins and an armature, FIG. 1a illustrates the principle of a piezo-electric motor as shown in FIG. 1, in which the free ends of the pins are provided with heads to increase the contact area with the friction surface of the armature, FIG. 2 is a side section view of a piezo-electric motor with a radial arrangement of the drive pins and a substantially cup-shaped armature which surrounds a piezo-electric ring, FIG. 3 is a plan section of the piezo-electric ring in the piezo-electric motor of FIG. 2, with drive pins arranged on its outer wall, FIG. 4 is a plan section of a modified embodiment of a piezo-electric motor as shown in FIG. 2, comprising an armature divided into two sections, the two armature sections being radially pressed against the drive pins, FIG. 5 is a side section view a piezo-electric motor in an axial version, comprising drive pins on a flat circular surface and an armature disc which is pressed against the drive pins, FIG. 6 is a plan view of the flat vibration surface carryiny the drive pins in the piezo-electric motor shown in FIG. 5, FIG. 7a is a plan view of a part of the vibration surface shown in FIG. 6, with pins having an angle of inclination which decreases from the inside towards the outside, FIG. 7b is a side view of the vibration surface shown in FIG. 7a, FIG. 8 is a side view of a piezo-electric motor constructed as a linear motor capable of linearly reciprocating a shaft over a predetermined distance, FIG. 9 shows the drive section of the piezo-electric motor in a sectional view taken on the line IX—IX in FIG. 8, FIG. 10 shows a second embodiment of a piezo-electric linear motor comprising an U-shaped armature and two vibration elements which can be energised independently of one another.

DETAILED DESCRIPTION OF THE DRAWINGS

Figure 1:
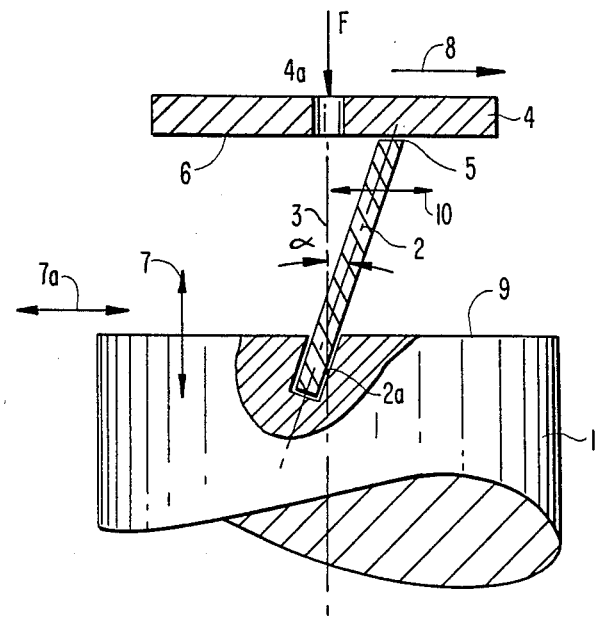

The construction principle of a piezo-electric motor illustrated in FIG. 1 can be applied both to a linear motor and to a rotary motor. A drive pin 2 is cemented into a bore 2a in a piezo-electric vibration element 1, shown purely diagrammatically in FIG. 1. The drive pin 2 is inclined at an angle $\alpha$ relative to a perpendicular 3 to an armature 4 which is rotatable about an axis 4a. The armature 4 is pressed against the free end of the drive pin 2 with a pressure represented by an arrow F. As a result of this a contact surfaces of the drive pin 2 is in contact with the friction surface 6 of the armature 4. The piezo-electric vibration element 1 is now set into vibration in a direction perpendicular to the friction surface 6 of the armature 4, as is indicated by the double arrow 7 in FIG. 1. This vibration causes the contact surface 5 of the drive pin 2 to be applied to the friction surface 6 of the armature 4 in a pulsating manner, the armature being moved to the right in the direction indicated by an arrow 8 each time that the surface 9 of the vibration element 1 approaches the friction surface 6 of the armature 4. The contact surface 5 of the drive pin 2 then performs a movement to the right in the direction indicated by the straight part of a double arrow 10. If the surface 9 of the vibration element 1 moves away from the armature 4, the tip of the pin is moved to the left in the direction indicated by the left-hand part of the double arrow 10. The normal force exerted on the armature 4 and hence the frictional force between the drive pin 2 and the armature 4 when the surface 9 of the vibration element 1 approaches the armature 4 is larger than when these parts move away from one another. Moreover, when the contact surface 5 moves to the right relative to the friction surface 6 the friction amplifies itself and when the contact surface 5 moves to the left relative to the friction surface 6 the friction attenuates itself. Thus, the armature 4 experiences a resultant force to the right and is moved in the direction indicated by the arrow 8.

Alternatively, the vibration element 1 may vibrate in a direction parallel to the friction surface 6 of the armature, as is indicated by the double arrow 7a. The self-amplifying friction effect during the movement of the contact surface 5 to the right relative to the friction surface 6 and the self-attenuating effect during the movement to the left relative to said friction surface again yields a resultant force to the right and hence an armature movement in the direction indicated by the arrow 8. The pin 2 acts as a mechanical rectifier, which causes the armature to move to the right in the direction indicated by the arrow 8 in FIG. 1 in the case of vibrations of the vibration element 1 in a vertical or horizontal direction.

The setting angle $\alpha$ is now selected in such a way that it is substantially equal to or slightly larger than the static-friction angle $\alpha_H$, which is defined as follows $$\alpha_H = \text{arc tan } \mu.$$

Here, $\mu$ is the coefficient of friction between the drive pin 2 and the friction surface 6.

However, there is not provided just one drive pin 2. Instead there are a plurality of such pins 2, arranged like brushes at an angle $\alpha$, which is selected to be substantially between 15° and 25°. The setting angle $\alpha$ of the order of magnitude of approximately 20° provides a very high motor efficiency.

Figure 1A:
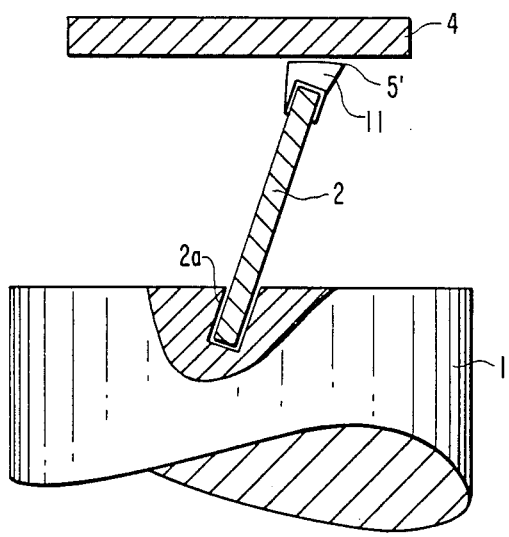

The individual drive pins 2 may be of different construction. It is always important that the pins and the armature constitute a suitable friction pair. A satisfactory friction pair is obtained, for example, if the pins are made of spring steel and the armature is made of steel or aluminium oxide (ceramic). However, in the case of an armature which is softer than steel the pins may be constructed in such a way that at least at the contact surface 5 they comprise a head 11 whose contact area 5' with the armature 4 is enlarged in conformity with the reduced hardness. FIG. 1a shows such a pair, of which the drive pin 2 is provided with a head 11. This head 11 may be moulded on or it may be integral with the pin 2.

It is also possible that the pins 2 are made of steel or tough plastics and the friction surface 6 of the armature 4 is made of a tough plastics, such as a glass-fibre or carbon-fibre-reinforced resin. If the pin is made of steel, it is again provided with a head 11 and if the pin 2 is made of a synthetic material it will have substantially the same thickness as the head 11.

It is found that the direction of vibration of the piezo-electric vibration element 1 is of minor importance for a correct operation of the piezo-electric motor. A direction of vibration as indicated by the double arrow 7a, parallel to the friction surface 6 of the armature 4, also yields a satisfactory performance.

A first embodiment of a piezo-electric motor will now be described in more detail with reference to FIG. 2. In this piezo-electric motor an insulation sleeve 13 is rotationally locked to a stationary shaft 12. A metal ring 14 is also rotationally locked to said insulation sleeve 13. This metal ring 14 surrounds an annular piezo-electric vibration element 15, which is elastically connected to the metal ring 14 via a foil 16. From the side of the outer wall 17 drive pins 2 are mounted in the piezo-electric vibration element 15, for example in a manner as described with reference to FIG. 1. The drive pins 2 have different lengths in conformity with the conical shape of the inner wall 19 of a cup-shaped armature 18. The inner wall 19 is constructed as a friction surface as shown in FIG. 1. The cup-shaped armature 18 is rotatably supported in a ball-bearing 20. The armature 18 can be urged against the drive pins 2 by means of a tensioning nut 21 and a spring 22 on which said nut acts. The different lengths of the pins 2 and the conical shape of the friction surface 19 guarantee a steady contact between the pins and the friction surface 19 of the armature 18, even in the event of wear to the pins or the friction surface.

Figure 2:
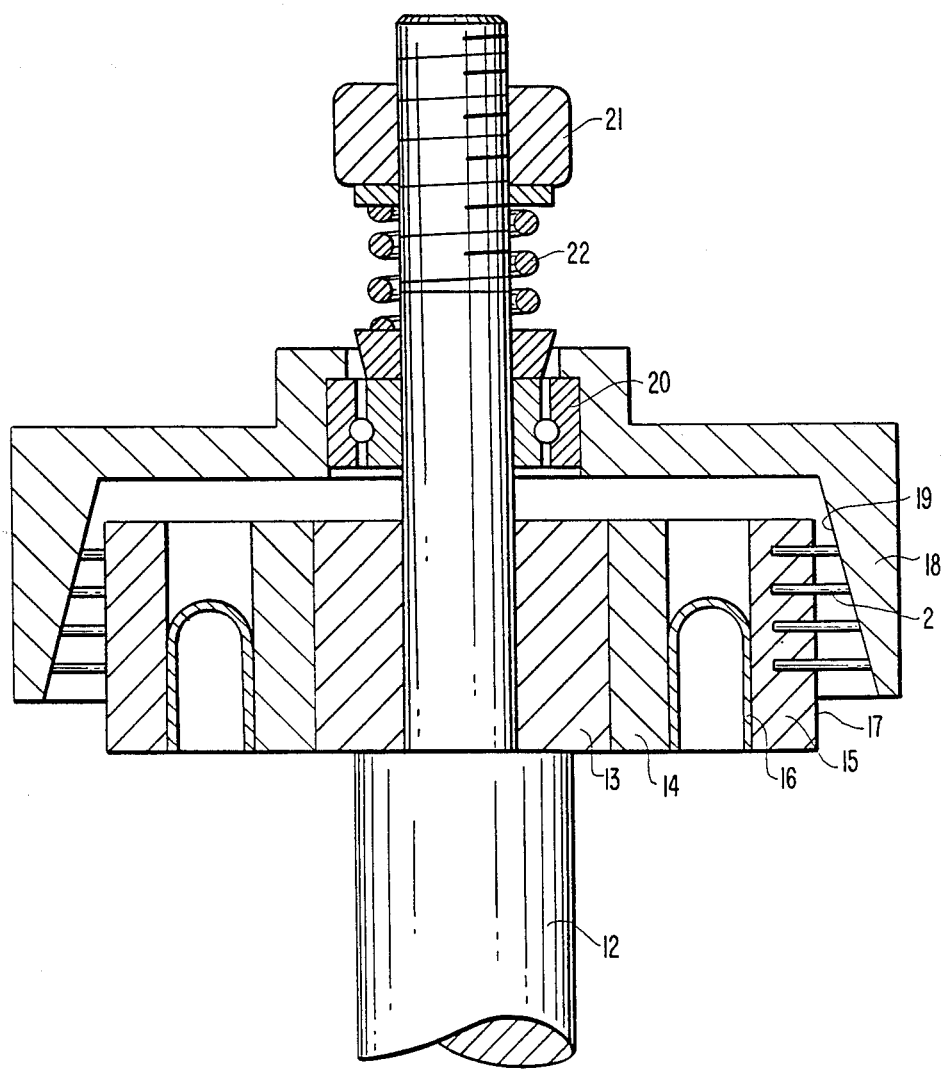
Figure 3:
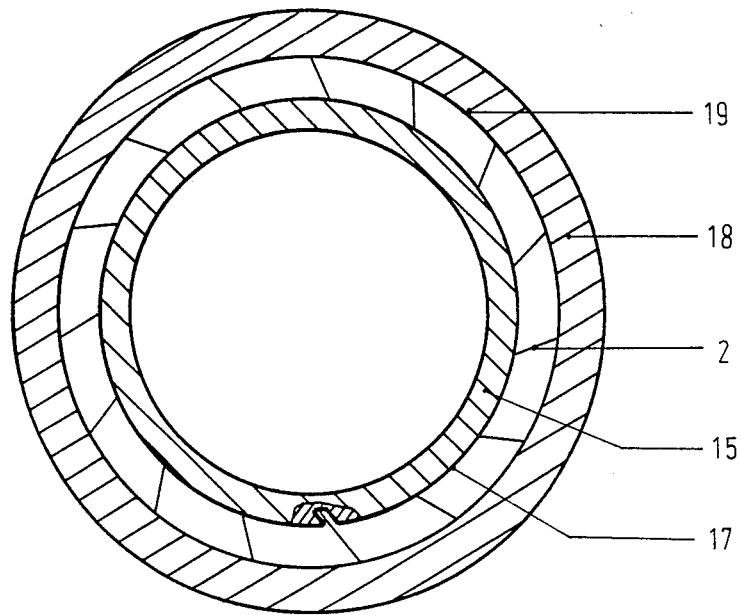

FIG. 3 illustrates how the annular piezo-electric element 15 of FIG. 2 is provided with drive pins 2 on its outer wall 17 and how these pins 2 are inclined at an angle $\alpha$ of approximately 20° relative to the friction surface 19 of the armature 18.

In order to obtain a vibration amplitude of the order of magnitude of a few $\mu$m the vibration element 15 in FIG. 2 is energised with a sinewave voltage having a frequency of, for example, 34 kHz via electrodes, not shown.

Figure 4:
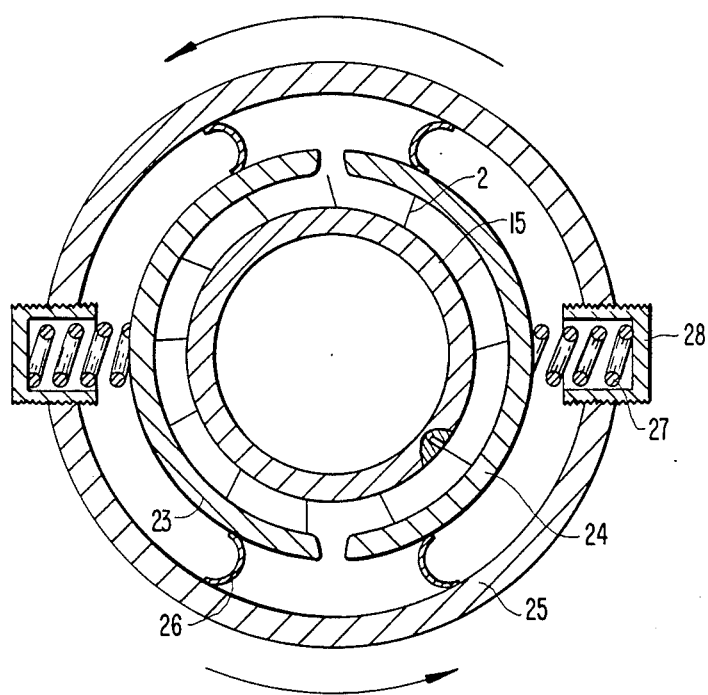

In an embodiment shown in FIG. 4 the piezo-electric ring 15 is surrounded by two armature sections 23, 24. These armature sections are supported relative to a rigid outer ring 25 by means of foils 26. In addition, springs 27 act against the armature sections 23, 24 by means of spring cups 28. The tension or pressure exerted on the drive pins 2 by the armature sections 23, 24 can be adjusted by turning the cups 28 perpendicularly to the axis. The foils 26 ensure that the armature sections 23, 24 are rotationally locked to the ring 25.

Figure 5:
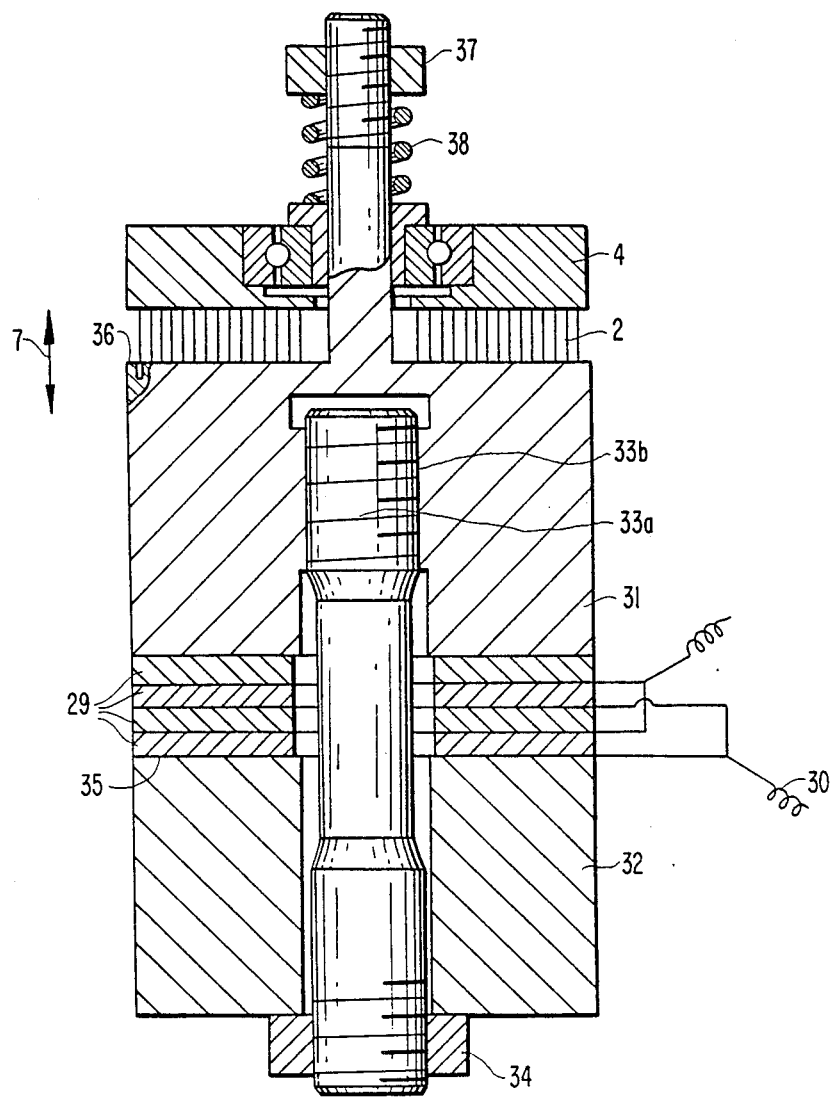

The embodiment shown in FIG. 5 is an axial version of the radial motor shown in FIGS. 2 to 4. In the present case a plurality of piezo-electric discs 29 can be connected to an alternating voltage source via terminals 30, so that these piezo-electric discs 29 can vibrate in the axial direction. The construction shown in FIG. 5 substantially corresponds to that of a dumb-bell vibrator. The piezo-electric discs are retained at both sides by two metal cylinders 31, 32. A dumb-bell-like shaft 33 is screwed into a metal body 31 by means of its head 33a, which is provided with screwthread 33b. By tightening a nut 34 the two metal cylinders 31 and 32 can clamp the piezo-electric discs 29 with the interposed electrodes 35 onto each other.

Figure 6:
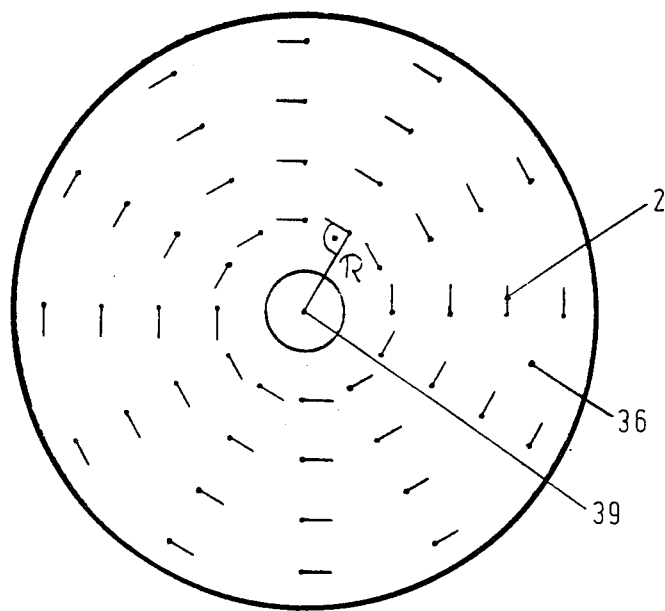

The piezo-electric discs 29 are axially polarised and are energised by applying a sinewave voltage via the cntacts 30. The frequency of this alternating voltage is selected in such a way that the longitudinal harmonic vibration of the dumb-bell is excited. In the embodiment shown in FIG. 5 the resonant frequency is, for example, 40 kHz. The surface 36 of the metal cylinder 31 then vibrates with an amplitude of a few $\mu$m in the direction indicated by the double arrow 7 in FIG. 1. The drive pins 2 are secured to the surface 36 of the vibrator. FIG. 6 is a plan view showing the arrangement of the pins 2 on the surface 36 of the vibrator. All the pins are inclined at an angle $\alpha$ relative to the perpendicular to the surface 36. They are secured in such a way that the connecting line R between the centre 39 of the surface 36 and the foot point of the pin encloses a right angle with the pin axis. As is shown in FIG. 5, the armature disc 4 is pressed against the drive pins by means of a nut 37 and an interposed spring 38, and it is rotated as a result of the annular arrangement of the pins. In the present embodiment the drive pins 2 are all inclined at the same angle $\alpha$ relative to the perpendicular to the surface 36 of the vibrator. This setting angle is approximately 20°.

Figure 7A:
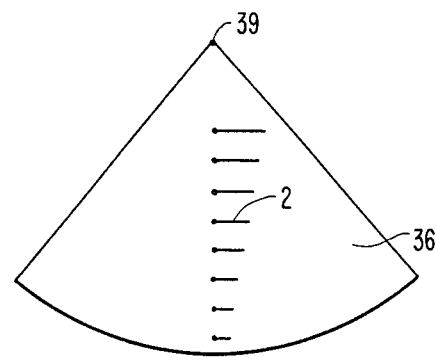
Figure 7B:
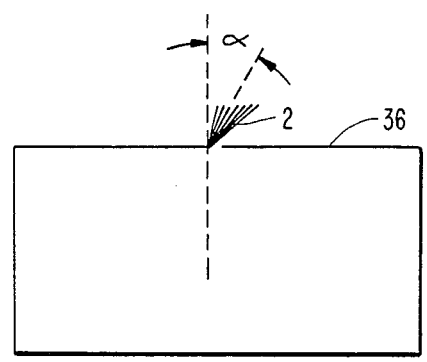

In a further embodiment of the invention the setting angle of the pins, as is shown in a plan and side view of a part of the surface 36 of the vibrator in FIG. 7, decreases as the distance between the pins and the axis 39 of the armature increases. As a result of the varying angle $\alpha$ of the drive pins 2 all the pins are subjected to substantially equal loads and contribute substantially equally to driving.

Figure 8:
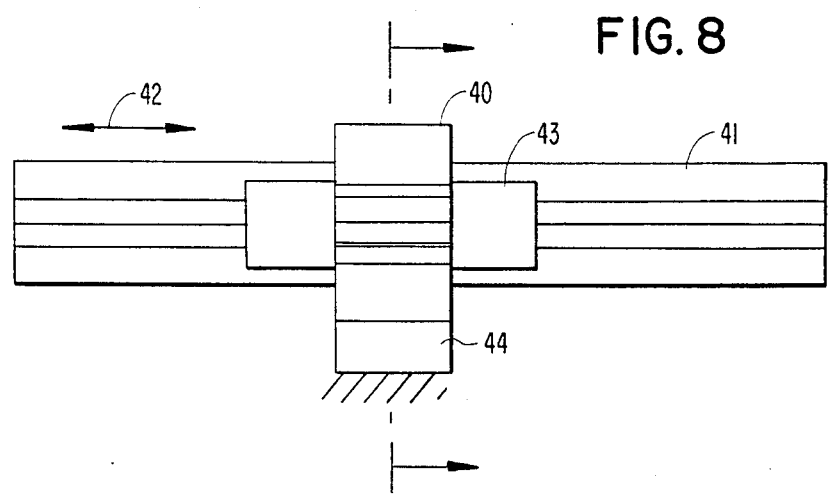
Figure 9:
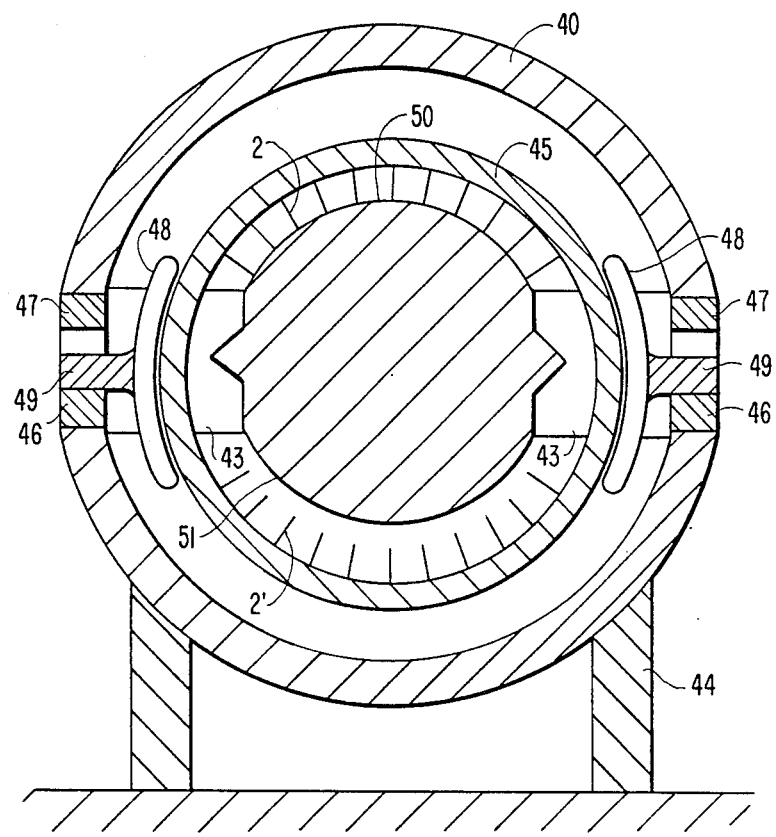

FIG. 8 shows a linear piezo-electric motor. The drive member is mounted in a housing 40 and moves the shaft 41 horizontally to the left or the right, as is indicated by a double arrow 42. The shaft is supported by means of the slide member 43. It is fixedly connected to the housing 40. In the present embodiment the housing 40 is mounted in the apparatus by means of the support 44. However, it is equally possible to secure the shaft fixedly in the apparatus. The drive member then moves as a runner on the shaft 41 to the left or the right in the horizontal direction.

FIG. 8 shows the drive member in a sectional view taken on the line IX—IX in FIG. 8. The shaft 41 is guided in the slide members 43. These slide members are fixedly connected to the hollow cylindrical housing 40. The housing 40 is secured in the apparatus by means of the support 44. The guide members only pemit a movement of the shaft 41 in a direction perpendicular to the plane of the drawing. A piezo-electric hollow cylinder 45 is supported so as to be vertically slidable relative to the housing 40. In the embodiment shown this displacement is obtained by means of electromagnets 46, 47; however, this can also be achieved by mechanically, for example by means of a lever, an eccentric, a cam disc, a wormgear etc., or piezo-electrically.

The piezo-electric hollow cylinder 45 is guided in the housing by means of diaphragms 48 and metal sheets 49. The diaphragms 48 ensure that the piezo-electric ring 45 is rotationally locked and is axially immobilised but can vibrate in the radial direction. If the lower magnet pair 46 is energised the metal plates 49 and hence the piezo-electric ring 45 are pulled downwards. As a result of this the drive pins 2, which are secured to the upper half of the inner wall of the piezo-electric hollow cylinder, are pressed against the upper friction surface 50 of the shaft 41. When the upper magnet pair 47 is energised the metal plates 49 are drawn upwards. As a result of this the drive pins 2', which are secured to the lower half of the piezo-electric hollow cylinder 46, are pressed against the lower friction surface 51 of the shaft. Each pin is secured to the inner wall of the piezo-electric hollow cylinder in such a way that its axis is situated in the same plane as the cylinder axis and subtends an angle $\alpha$ with the perpendicular to the piezo-electric hollow cylinder through the foot point of the pin. The drive pins 2 on the upper half of the piezo-electric hollow cylinder 45 are inclined upwardly relative to the plane of the drawing and the drive pins 2' are inclined downwardly relative to the plane of the drawing.

A sinewave voltage is applied to the piezo-electric hollow cylinder 45 via electrodes not shown. The frequency of this voltage is selected so as to excite the radial fundamental vibration of the piezo-electric hollow cylinder. If the drive pins 2 are pressed against the upper friction surface 50 of the shaft 41 by energising the lower magnet pair 46 the shaft will be moved upwardly relative to the plane of the drawing, because of the inclination of the drive pins. Conversely, when the upper magnet pair 47 is energised the shaft 41 will be moved downwardly relative to the plane of the drawing.

The drive pins 2 and 2' all have the same length. The shaft 41 is of oval cross-section. The friction surfaces 50 and 51 are constructed in such a way that all the pins exert the same pressure on the corresponding friction surface 50 or 51.

Figure 10:
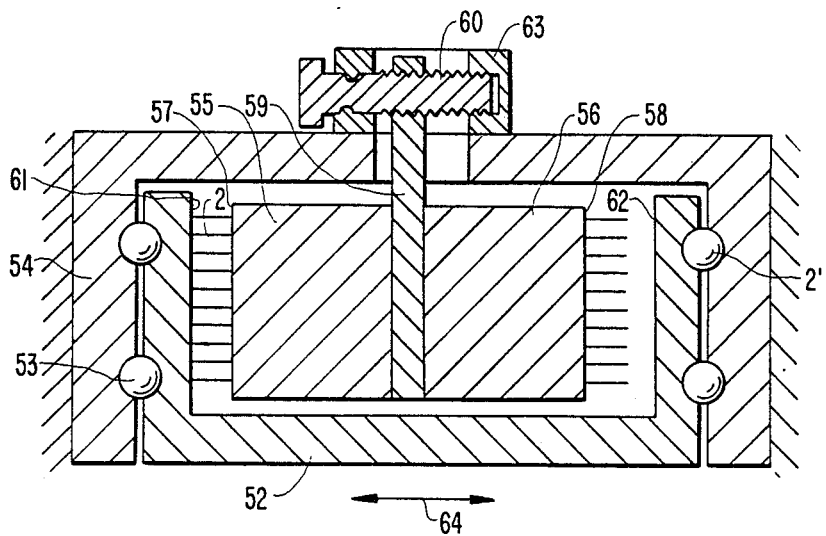

FIG. 10 is a sectional view of a second embodiment of a piezo-electric linear motor. An U-shaped armature 52 is guided in a housing 54 by means of ball-bearings 53 and can move up and down perpendicularly to the plane of the drawing. The drive member of the motor comprises two piezo-electric resonators 55, 56 which can be energised separately via electrodes, not shown. Drive pins 2, 2' are secured to the surfaces 57, 58 of the resonators. These pins are inclined towards the motor axis at an angle $\alpha$ relative to the perpendicular to the surfaces 57 and 58. Their axes define a plane with the direction of movement of the armature 52. The free ends of the pins 2 extend downwardly into the plane of the drawing and the free ends of the pins 2' extend upwardly from the plane of the drawing.

The resonators are secured to a plate 59; they can be moved perpendicularly to the friction surfaces 51, 52 of the armature 52 by means of a threaded spindle 60. The plate 59 is guided by means of an element 63 which is fixedly connected to the housing 54. As a result of the movement of the plate either the drive pins 2 or the drive pins 2' engage against the friction surfaces 61 and 62 respectively of the armature 52. The pressure of the pins on the armature and hence the driving force of the motor can be adjusted accurately by means of the threaded spindle 60.

The resonators 55, 56 are separately excited into resonance by means of a sinewave voltage. The surfaces can then vibrate perpendicularly to the friction surfaces 61, 62 in the direction indicated by double arrow 64 or parallel to the friction surfaces in the direction of the motor shaft. In both cases the armature 52 is reciprocated perpendicularly to the plane of the drawing by the arrangement of drive pins 2, 2'. The armature 52 moves downwardly relative to the plane of the drawing when the drive pins 2 are pressed against the friction surface 61 and the resonator 55 is energised. Conversely, the armature 52 moves upwardly relative to the plane of the drawing when the pins 2' are pressed against the friction surface 62 and the resonator 56 is energised.

The optimum angle of inclination α of the drive pins is substantially between 10° and 30°. Instead of the drive pins planar elements may be employed or, to enlarge the contact area with the drive surfaces, the pins may be provided with heads. For an optimum efficiency of the linear motor and minimal wear, suitable friction pairs must be selected. Satisfactory results are obtained, for example, with hardened steel pins and friction surfaces of a ceramic material, steel or special loaded plastics.

In the embodiment shown in FIG. 10 the direction of movmement of the armature is reversed by means of a threaded spindle. However, reversal can also be effected magnetically or piezo-electrically with the air of an eccentric, a toggle or a lever.

What is claimed is:

1. A rotary or linear electric motor whose armature (4) is driven by piezo-electric vibration elements (1) which are made to resonante by means of high-frequency electrical oscillations in order to produce ultrasonic vibrations which are transmitted to a plurality of drive pins (2) which are arranged as brushes and against whose free ends (5) a friction surface (6) of the armature (4) is pressed, the individual drive pins (2) being disposed at an angle α relative to the normal to the contact portion of the friction surface (6), characterized in that the setting angle α is selected to be equal to or slightly larger than the static-friction angle, which is defined as follows $$\alpha \text{ static friction} = \arctan \mu,$$

where μ is the coefficient of friction between the drive pins (2) and the friction surface (6).

2. A rotary or linear electric motor as claimed in claim 1, characterized in that the setting angle is selected to be between 10° and 30°.

3. A rotary or linear electric motor as claimed in claim 1, characterized in that the direction of vibration is perpendicular to the friction surface (6) or parallel to the friction surface (6) in a manner known per se.

4. A rotary or linear electric motor as claimed in claim 1, characterized in that of the cooperating friction pairs comprise pins (2) of spring steel and an armature (4) made of steel or a ceramic material ($Al_2O_3$).

5. A rotary or linear electric motor as claimed claim 1, characterized in that of the cooperating friction pairs (2, 6) comprise an armature of a material softer than steel and pins (2) which at least at their free ends (5) comprise a head (11) whose contact area (5') with the armature (4) is enlarged in proportion with the reduced hardness.

6. A rotary or linear electric motor as claimed in claim 5, characterized in that the pins (2) are made of steel or a tough synthetic resin and the armature (4) is made of a tough synthetic resin, such as glass-fibre or carbon-fibre-reinforced resins.

7. A rotary or linear electric motor as claimed in claim 1, characterized in that the setting angle α of the drive pins (2) in a rotary motor comprising a circular flat armature disc (4) decreases from the armature axis towards the periphery of the armature disc.

8. A rotary or linear electric motor as claimed in claim 1, characterized in that a piezo-electric annular vibration element, which is supported elastically in a radial direction and which is supported to be torsionally stiff in a circumferential direction, carries projecting drive pins (2) on its outer wall (17), which pins cooperate with an inner wall (19) of an armature (18).

9. A rotary or linear electric motor as claimed in claim 8, characterized in that the inner wall (19) of the cup-shaped armature (18) is conical and the drive pins (2) have different lengths adpated to said conical shape, so that the pins (2) are always pressed against the inner wall with a substantially constant force, even in the event of wear of said pins or the inner wall (19).

10. A rotary or linear electric motor as claimed in claim 8, characterized in that the armature (18) is divided into two sections (23, 24), which are separately spring-loaded against the drive pins (2).

11. A rotary or linear electric motor as claimed in claim 1, characterized in that in the case of a linear motor the vibration element is constructed as a piezo-electric hollow cylinder (45) through which a shaft (41) is passed, either the shift (41) being movable as an armature relative to a stationary hollow cylinder (45) or the hollow cylinder (45) being movable as a runner relative to the shaft (41).

12. A rotary or linear electric motor as claimed in claim 11, characterized in that the shaft (41) is of oval cross-section.

13. A rotary or linear electric motor as claimed in claim 11, characterized in that the drive pins (2) on the upper half and the drive pins (2') on the lower half of the inner wall of the piezo-electric hollow cylinder (45) are arranged in such a way that the pins (2), when they are pressed against the friction surface (50), produce a relative movement with respect to the shaft (41) in one direction and the other pins (2'), when they are pressed against the friction surface (51), produce a relative movement in the opposite direction.

14. A rotary or linear electric motor as claimed in claim, characterized in that in the case of a linear motor the drive member comprises two piezo-electric vibrators (55, 56) which can be energised independently of one another.

15. A rotary or linear electric motor as claimed in claim 14, characterized in that it comprises an armature (52) of U-shaped construction and on the surfaces (57, 58) of the vibration elements (55, 56) drive pins (2, 2') are arranged in such a way that when the pins (2) are pressed against the friction surface (61) the armature (52) is moved in one direction and when the pins (2') are pressed against the friction surface (62) said armature is moved in the opposite direction.

* * * * *